(12) United States Patent
Hobbs et al.

(10) Patent No.: US 7,136,790 B1
(45) Date of Patent: Nov. 14, 2006

(54) METHOD, SYSTEM, AND PROGRAM PRODUCT FOR ENABLING DESIGN OF PRODUCTS HAVING A VISUAL EFFECT

(75) Inventors: Stanley Young Hobbs, Scotia, NY (US); John Frederick Graf, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 316 days.

(21) Appl. No.: 09/547,243

(22) Filed: Apr. 11, 2000

Related U.S. Application Data

(60) Provisional application No. 60/147,966, filed on Aug. 9, 1999.

(51) Int. Cl.
*G06G 7/48* (2006.01)
*G09G 5/02* (2006.01)

(52) U.S. Cl. .................... 703/6; 345/589; 345/591

(58) Field of Classification Search .............. 703/6; 345/771–773, 589; 356/406, 445; 428/328
See application file for complete search history.

(56) References Cited

U.S. PATENT DOCUMENTS

| | | | | |
|---|---|---|---|---|
| 4,711,580 A | * | 12/1987 | Venable | 356/406 |
| 5,593,773 A | * | 1/1997 | McKay et al. | 428/328 |
| 5,776,409 A | | 7/1998 | Almquist et al. | |
| 5,823,891 A | * | 10/1998 | Winskowicz | 473/378 |
| 6,166,814 A | * | 12/2000 | Pringle | 356/445 |

(Continued)

FOREIGN PATENT DOCUMENTS

EP 0747241 5/1996

(Continued)

OTHER PUBLICATIONS

Computer Images (Understanding Computers series), by Time-Life Books, 1986, ISBN 0-8094-5662-1, pp. 34-35, 68-69, 78-79, 80, 102.*

(Continued)

*Primary Examiner*—Paul Rodriguez
*Assistant Examiner*—Dwin M. Craig
(74) *Attorney, Agent, or Firm*—Fletcher Yoder

(57) ABSTRACT

A method and system are disclosed for enabling design of a product such as a colored plastic having a visual effect caused by an additive. In one embodiment, a user such as a designer at a first computing unit is able to interact with a second computing unit operable to provide a generally accurate representation of the product having the visual effect. Desirably, the user inputs information relating to the additive such as a flake material or a diffuser material and the system provides a representation displayable on a display or monitor of the first computing unit of the product having the visual effect based on the information relating to the additive. The design of the product having the visual effect is advantageously stored on the second computing unit and accessible by at least one second user such as a marketer or manufacturer for review of the design. Further, the users can order plaques of the designed product having the visual effect so that a comparison of the product having the visual effect to actual samples of the product can be made before a production order is placed.

71 Claims, 7 Drawing Sheets

U.S. PATENT DOCUMENTS

| | | | |
|---|---|---|---|
| 6,747,662 B1 * | 6/2004 | Masuda et al. | 345/591 |
| 6,996,509 B1 * | 2/2006 | Strumolo et al. | 703/6 |

FOREIGN PATENT DOCUMENTS

| | | |
|---|---|---|
| EP | 0790584 | 2/1997 |
| GB | 2332348 | 12/1997 |
| JP | 08260449 | 1/1996 |

OTHER PUBLICATIONS

Communications (Understanding Computers series), by Time-Life Books, 1986, ISBN 0-8094-5700-8, pp. 66-67.*

Computer Security (Understanding Computers series), by Time-Life Books, 1986, ISBN 0-8094-5670-2, pp. 76-77.*

Patent Abstracts of Japan Japanese Patent No. JP10105593 Apr. 24, 1998.

* cited by examiner

METHOD, SYSTEM, AND PROGRAM PRODUCT FOR ENABLING DESIGN OF PRODUCTS HAVING A VISUAL EFFECT

CROSS-REFERENCE TO RELATED APPLICATION

This application claims the benefit of U.S. Provisional Application No. 60/147,966, filed Aug. 9, 1999, entitled "Computer Simulations of 'Special Effects' in Plastics," the entire contents of which is hereby incorporated by reference.

BACKGROUND OF THE INVENTION

The present invention generally relates to product design, and more particularly, to a method and system for enabling design of products having a visual effect.

Colored plastics having a visual effect have recently gained widespread use by manufacturers in producing various products. For example, additives such as small reflective flakes of metal or glass are added to plastics to create a speckled appearance, and additives such as small threads or mineral particles are added to plastics to create a stone-like appearance. In addition, additives such as small particles which are mismatched in refractive index with respect to the base plastic resin result in the plastic being translucent wherein objects cannot be clearly seen through the plastic. A large number of plastics having different visual effects can be produced by combining such additives in various concentrations.

Currently, customers can choose from a limited number of manufacturer developed colored plastics having visual effects. If a customer desires a colored plastic having a customized visual effect, it then becomes a trial and error approach of trying different concentrations and combinations of a base material, coloring ingredients, and additives until the desired colored plastic having the visual effect is achieved. Often, the customer must travel to the plastic manufacturer or a color development laboratory to work with lab technicians to develop the colored plastic having the visual effect. This trial and error design approach is time consuming and costly.

There is a need for a more efficient way for enabling customers to design products having a visual effect such as a colored plastic having a visual effect.

SUMMARY OF THE INVENTION

The present invention provides, in a first aspect, a computer-implemented method for enabling design of a product having a visual effect caused by an additive which includes obtaining information relating to the additive, and providing a representation of the product having the visual effect based on the information relating to the additive.

The present invention provides, in a second aspect, a method for enabling design of a product having a visual effect caused by an additive which includes obtaining information relating to the additive from a first user at a first computing unit coupled via a communications network to a second computing unit, and providing from the second computing unit from the second computing unit a representation of the product having the visual effect for display on the first computing unit based on the information relating to the additive.

Systems and computer program products corresponding to the above-summarized methods are also described and claimed herein.

DETAILED DESCRIPTION OF THE INVENTION

Figure 1:
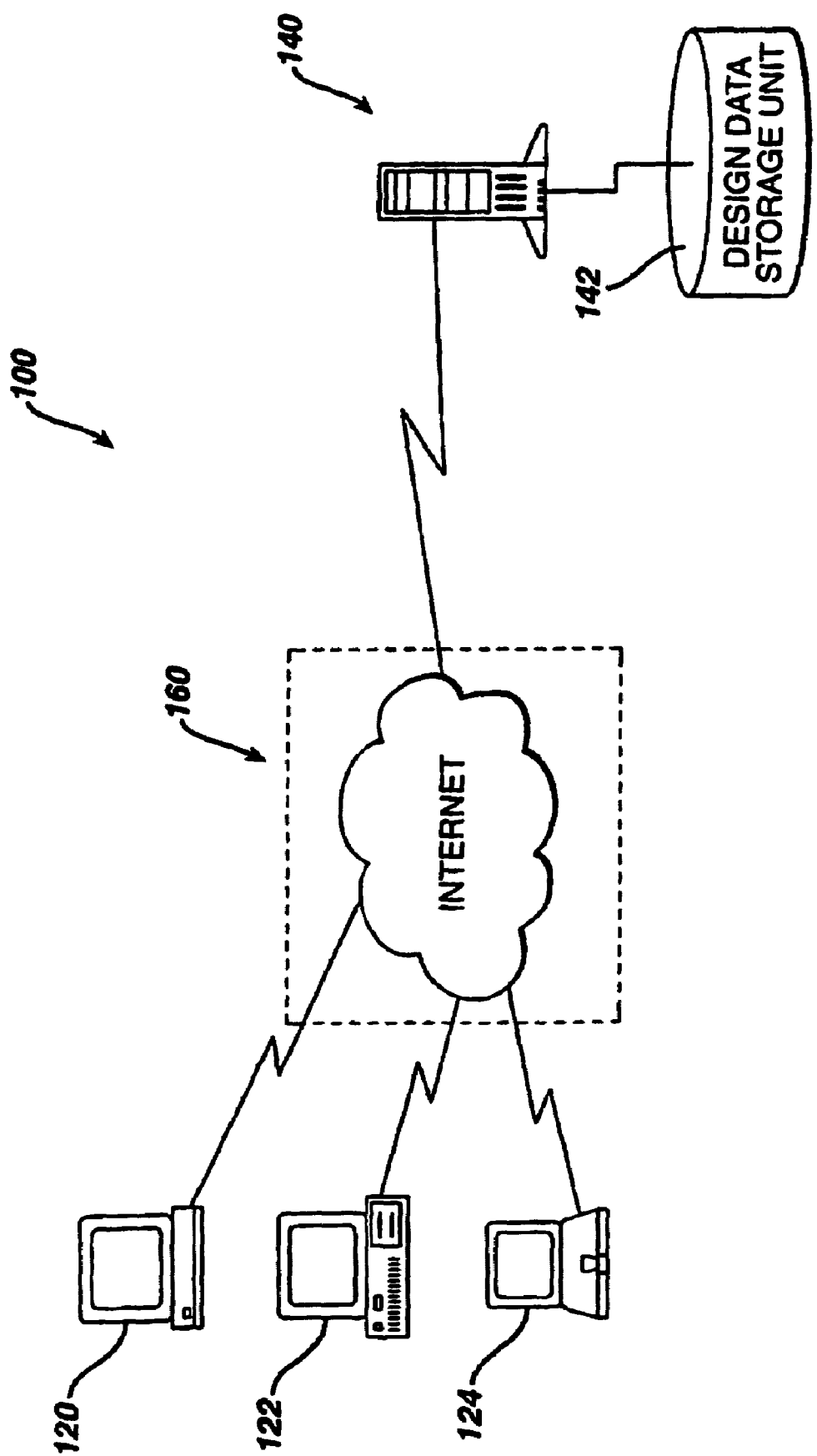
FIG. 1 is a block diagram illustrating one example of a system of the present invention for enabling design of products having a visual effect.

FIG. 1 is a block diagram of one example of a computing environment 100 incorporating and using the capabilities and techniques of the present invention for enabling design of a product having a visual effect. Computing environment 100 is desirably suitable for implementation by a product vendor such as a plastic manufacturer, for use by a customer such as a project team composed of a marketer, a designer, and an engineer, in designing products such as colored plastics having a visual effect. As explained in greater detail below, computing environment 100 allows accurately reproducing various products having a visual effect resulting in reduced cost and time in designing products having a visual effect by laboratories compared to physically producing such products.

As used herein the term "visual effect" includes, for example, speckled, metallic, pearlescence, fluorescence, angular metamerism (e.g., the phenomenon where two colors appear to match under one light source, yet do not match under a different light source), granite, stone, brick, and the like appearances, as well as a translucent capability, and combinations thereof.

Computing environment 100 includes, for instance, at least one first computing unit 120 coupled to at least one second computing unit 140. In one example as illustrated in FIG. 1, a plurality of first computing units 120, 122, and 124 represent a customer or customer's project team composed of, for example, a designer, a marketer, and an engineer, respectively, each which may be located a different location, while computing unit 140 is a server operated by or maintained on behalf of a product manufacturer such as a plastics manufacturer. First computing units 120, 122, and 124 are coupled to second computing unit 140 via a communications network 160.

Each computing unit typically includes, for example, one or more central processing units, memory and one or more input/output devices, as is well known in the art. First computing units 120, 122, and 124 are, for instance, personal computers, such as personal computers executing Microsoft WINDOWS, which runs on the Intel PC architecture.

Computing unit 140 is based, for instance, on a Sun workstation running a Unix operating system. Computing unit 120 desirably includes or has access to memory or data storage units, e.g., hard drive(s), compact disk(s), tape drive(s), etc., for storing various data which is accessed and used in enabling the design of products having visual effects.

Communications network 160 typically comprises a local area network or a global communications network such as the INTERNET which comprises a vast number of computers and computer networks that are interconnected through communication links. The interconnected computers exchange information using various services, such as electronic mail, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, for example, computing unit 120 specifies the URL for that Web page in a request (e.g., a HyperText Transfer Protocol ("HTTP") request). The request is forwarded to the Web server, for example, second computing unit 140, that supports that Web page. When that Web server receives the request, it sends that Web page to first computing unit 120. When first computing unit 120 receives that Web page, it typically displays the Web page using a browser. A browser is a special-purpose application program that effects the requesting of Web pages and the displaying of Web pages. First computing unit 120 typically uses a browser such as Microsoft INTERNET EXPLORER or Netscape NAVIGATOR.

More particularly, web pages are typically defined using HyperText Markup Language ("HTML"). HTML provides a standard set of tags that define how a Web page is to be displayed. When a user indicates to the browser to display a Web page, the browser sends a request to the server to transfer to first computing unit 120 a HTML document that defines the Web page. When the requested HTML document is received by first computing unit 120, the browser displays the Web page as defined by the HTML document. The HTML document contains various tags that control the displaying of text, graphics, controls, and other features. The HTML document may contain URLs of other Web pages available on that server computer system or other server computer systems.

The above-described computing environment and/or computing units are only offered as examples. The present invention can be incorporated and used with many types of computing units, computers, processors, nodes, systems, work stations and/or environments without departing from the spirit of the present invention. Additionally, in various aspects of the present invention, the client need not be remote from the server. Various aspects of the invention are equally applicable to clients and servers running on the same physical machine, different physical machines or any combinations thereof.

Figure 2:
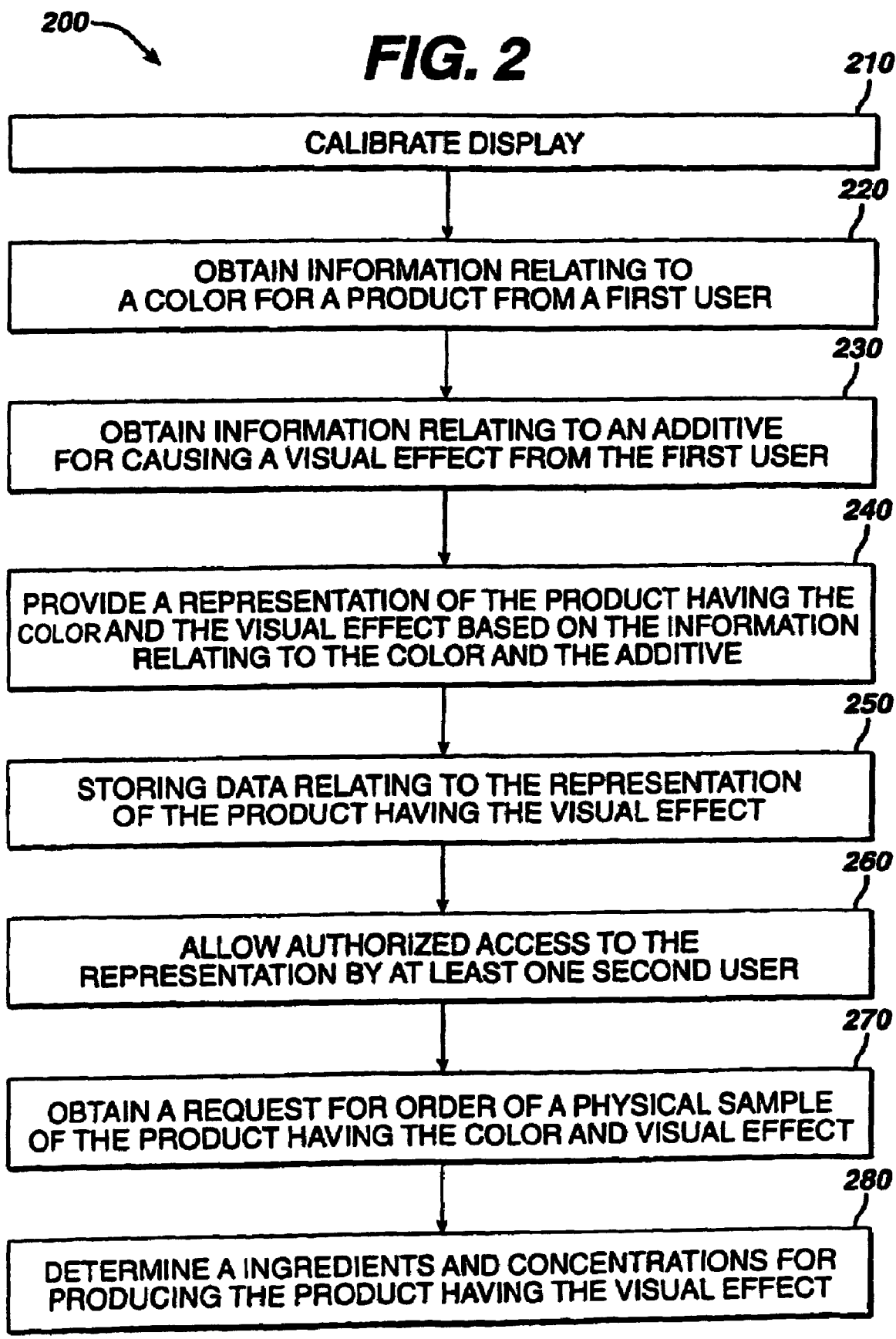
FIG. 2 illustrates a flow diagram of one example of the logic used for enabling design of products using the system of FIG. 1.

FIG. 2 illustrates a general overview of one example of a process 200 for enabling design of a product having a visual effect. Initially, a display or monitor of the first computing unit 120 (FIG. 1) is calibrated at 210, information relating to a color for a product is obtained from a first user at 220, information relating to an additive for causing a visual effect is obtained from the first user at 230, and a generally accurate representation of the product having the visual effect based on the information relating to the additive is provided at 240, for display on the display or monitor of first computing unit 120 (FIG. 1). Desirably, process 200 also includes storing data relating to the representation of the product at 250 so that authorized access to the representation is permitted by at least one second user at 260. Advantageously, a request for an order for a physical sample of the product having the visual effect is obtained at 270, and the ingredients and concentrations thereof are determined based on the representation, at 280, for physically producing the product having the visual effect.

Process 200 for enabling design of a product having a visual effect is typically implemented initially by a user at computing unit 120 linking to second computing unit 140. In one aspect of implementing process 200, various modules or applets (application software) which run in the browser are transferred from second computing unit 140 and downloaded to first computing unit 120 for enabling design of products having a visual effect.

The various modules or applets typically include a calibrate module, a project module, a color module, an opacity (diffuser) module, a flake (filler) module, an options module, a file module, and an order module, as described in greater detail below. Modules for simulating other types of additives, for example, which produce angular metamerism appearances, may also be included. Access to the various modules may be provided in a number of formats (e.g., a tab format, as illustrated), a banner or menu format (similar to that in many Microsoft products), an icon format, and other like formats.

Figure 3:
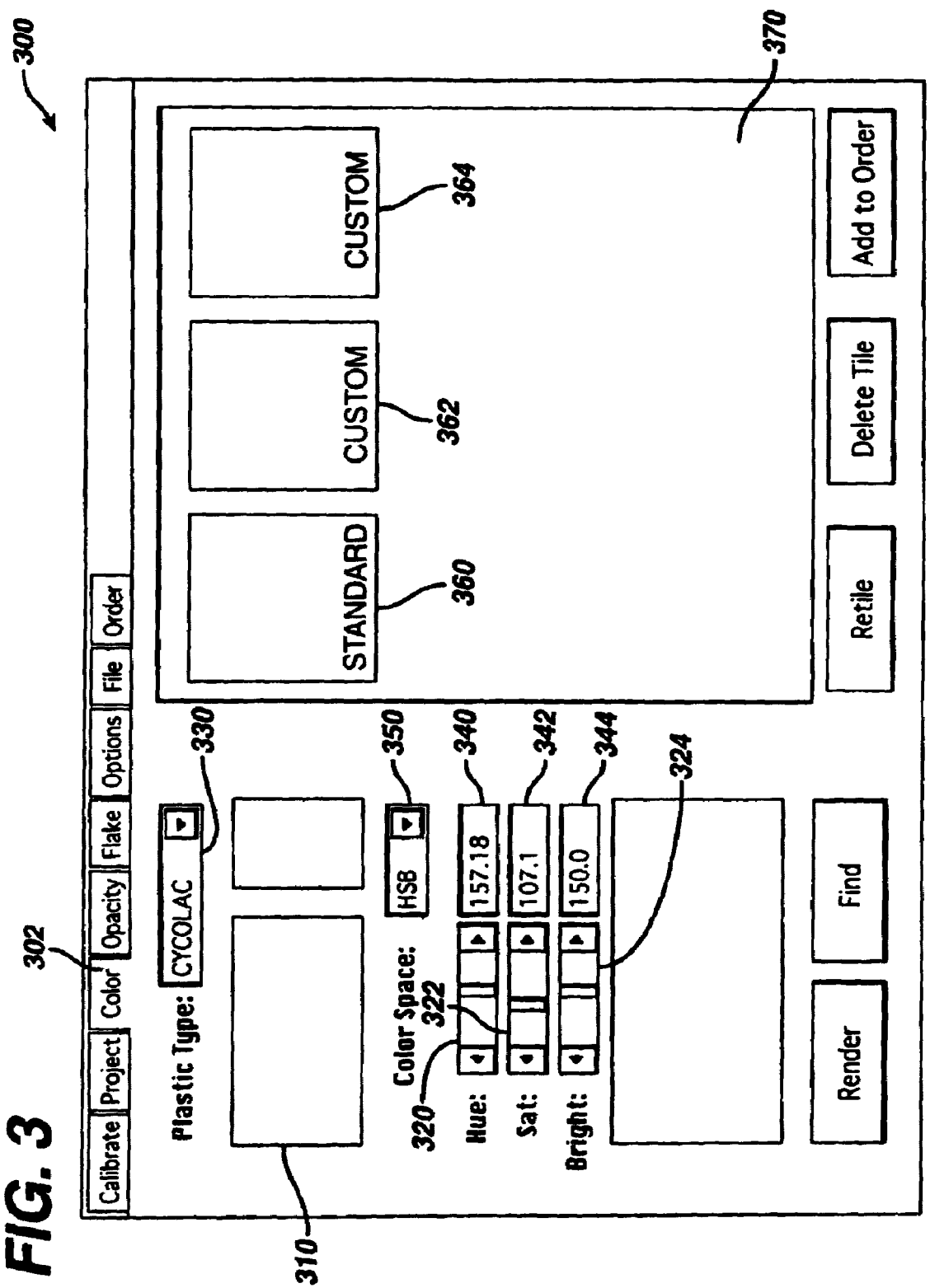
FIG. 3 is an illustration of one example of an interactive screen for selecting a color in accordance with one implementation of the process of FIG. 2.

As shown in FIG. 3, to access one of the plurality of modules, a user clicks on one of the plurality of tabs located along the top of the screen. Downloading modules or applets to first computing unit 120 desirably reduces the time needed to design products having a visual effect compared to first computing unit 120 transmitting various items of inputted information to second computing unit 140 and receiving processed data over communication network 160 from second computing unit 140. While the various modules, as described below, are transferred from the host computing unit to the user's computing unit, it will be appreciated by those skilled in the art that the selected or inputted information obtained from the user may be transferred to the host computing unit and processed, and the data for displaying a representation or rendered image then transferred to the user's computing unit.

Prior to a user designing a product having a visual effect, desirably the user calibrates a display or monitor of first computing unit 120. Calibration of the color of a display or monitor is known in the art and generally comprises adjusting colored shaded areas of red, green, and blue on the display to correspond with a surrounding checked area of pure color and black. Advantageously, the calibration module is initially downloaded to first computing unit 120, and while the user is calibrating their display, the other modules are downloaded.

With reference still to FIG. 3, FIG. 3 illustrates an example of an interactive screen 300 accessible by the user by clicking on a color tab 302 at the top of interactive screen 300 for selecting a target or desired color for the product. Interactive screen 300 is provided with a color palette 310 which displays various colors resulting from various combinations of red, green, and blue pixels of the display. To select a desired color, the user desirably selects a color within the area of color palette 310 using a mouse or other appropriate input device. Adjustment of the color of an initially selected color is typically made by adjustment of various components for the color. For example, adjustment of the color may be made by varying the hue (the basic color such as "red," "green," etc.), the saturation (the attribute of color perception that expresses the degree of departure from the gray of the same lightness), and the brightness (aspect of visual perception whereby an area appears to emit more or less light) using sliding bars 320, 322, and 324, respectively.

In addition, interactive screen 300 is also provided with interfaces for selecting a product type, for example, a base material for forming the product such as the type of plastic. Examples of plastic materials for forming the product include Cycolac, polycarbonate, ABS (acrylonitrile butadiene styrene), polypropylene, and the like plastics, which are desirably selectable by a drop-down menu 330.

Alternatively or in addition, an interactive screen may include color identification code fields 340, 342, and 344 for indicating or permitting input of a color identification code such as the hue, saturation, and brightness values as noted above, an RGB color code, or an L*a*b* color code. Additional fields may also allow input of a specific manufacturer color identification number, or a PANTONE color identification number. A drop-down menu 350 allows selecting the specific color code standard.

In particular, an RGB color code involves specifying a value for the red, green and blue components of the target color which values range from 0–255 for each component. For an L*a*b* color code, the "L*" component is the lightness/darkness of the target color, the "a*" component relates to the red/green aspect of the target color, and the "b*" component relates to the yellow/blue aspect of the target color. The "L*" component can have a value from 0 to 100, the "a*" component can have a value from –199 to +199, and the "b*" component can have a value from –199 to +199. Thus, if the components of the code are known, the user can specify and input the value for each component of the target color.

Where the desired color is inputted as a color code, the color code is used to select and retrieve from a database in the color module, data regarding illumination of the red, green, and blue pixels for generally accurately displaying the color on the user's display. The user selected colors are displayable, for example, as plaques 360, 362, and 364 in a virtual desk top 370. In addition, the plaques in virtual desk top 370 can include an indication of whether the color is a "standard" color or a "custom" color by comparison of the selected or inputted color to a database of standard colors.

Figure 4:
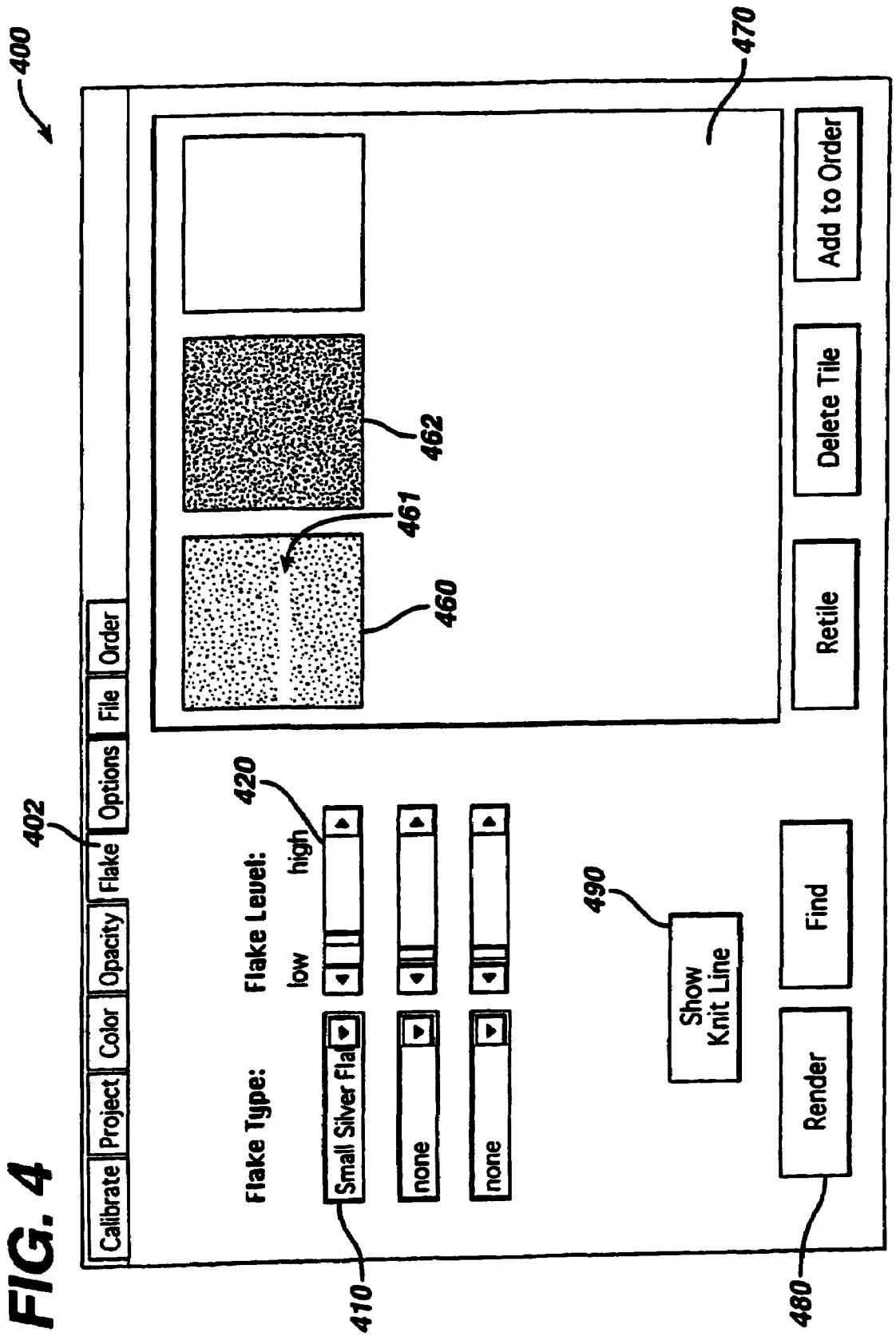
FIG. 4 is an illustration of one example of an interactive screen for selecting a flake material in accordance with one implementation of the process of FIG. 2.

FIG. 4 illustrates an example of an interactive screen 400 accessible by clicking on the flake tab 402 at the top of interactive screen 400 for introducing a speckled appearance to the product, e.g., the colored plaques of FIG. 3. Interactive screen 400 is provided with interfaces for selecting a flake type or material and a flake level or concentration. For example, a user uses their mouse or other input device to select the type of flake material, desirably by clicking on a drop-down menu 410 of flake types such as small silver flakes, large aluminum flakes, mica, and the like, and a flake level by adjusting sliding bar 420 between low and high concentration positions.

Each of the representations or plaques 460, 462, and 464 displayed in the virtual desk top 470 may be selectively modified to have a visual effect appearance corresponding to a selected flake type and flake level or concentration selected by the user. For example, each plaque can be separately selected, a flake type and flake level set, and the visual effect rendered by the user clicking on "Render" button 480. New rendered images can be produced by changing the flake type, and flake level, and again clicking on "Render" button 480. This process can be repeated until the desired visual effect is achieved by the user.

The visual effect may be computer generated, obtained from an image database, or a combination thereof. A series of polycarbonate blends were prepared containing between 0.001 and 0.005 parts by weight of metallic flakes for visual verification of computer generated representations of products having a visual effect such as speckled appearance as described below. Typically, metallic flakes such as aluminum flakes, supplied by a vendor are in a concentrate form. The concentrate is composed of aluminum flakes dispersed in a carrier material that is non-metal and dissolves into the polycarbonate. The fraction of carrier material used by the vendor for each aluminum Particle size is different. Table I shows the corresponding fraction of aluminum metal flakes found in each concentrate as supplied by the vendor. For example, if one adds 0.005 parts by weight of the compound with an aluminum flake of mean Particle size 225 microns, then 70% of the 0.005 parts by weight will actually be aluminum flake or 0.00375 parts by weight.

TABLE 1

| Mean Particle Size (microns) | % Aluminum |
| --- | --- |
| 165 | 85 |
| 225 | 70 |
| 330 | 85 |
| 650 | 85 |

In order to minimize breakup during compounding, the flakes and powdered resins were tumble blended and extruded on a single screw extruder using a mild screw. The pelletized blends were injection molded into a variety of plaques.

When the particle size exceeds about 200 microns, the original color and opacity of the base resin are retained and the individual particles appear as isolated metallic flakes imbedded within the part.

The resolution limit of a CRT display or monitor is defined by the size of the smallest pixel which can be displayed. This size is traditionally specified in terms of the dot pitch (the distance between the red, green and blue phosphor dots which form individual pixels) which can vary from about 0.15 mm for very high resolution displays to about 0.35 mm for lower resolution displays. Since a given pixel can be either "on" or "off," it is not possible to represent an object with a diameter of less than 150 microns even under optimum conditions.

The choice of pixel representation schemes for flakes with generally average diameters of about 165 microns, about 225 microns, about 330 microns, and about 650 microns was dictated primarily by a visual comparison of computer generated images and real parts. The configurations of pixels considered for a 330-micron flake is illustrated in FIG. 5, and the configuration of pixels considered for a 650-micron flake is illustrated in FIG. 6.

Figure 5:
FIG. 5 is an illustration of four examples of the pixel configuration for representation of a 330-micron flake.

With reference to FIG. 5, for a 330-micron flake, the side-by-side pixels configuration was eliminated because the length/width anisotropy was readily visible and unacceptable. The effect was less apparent in the corner to corner pixels, but the particles appeared to be fuzzy and poorly defined. The two-by-two square pixel configuration was found to be a suitable representation.

Figure 6:
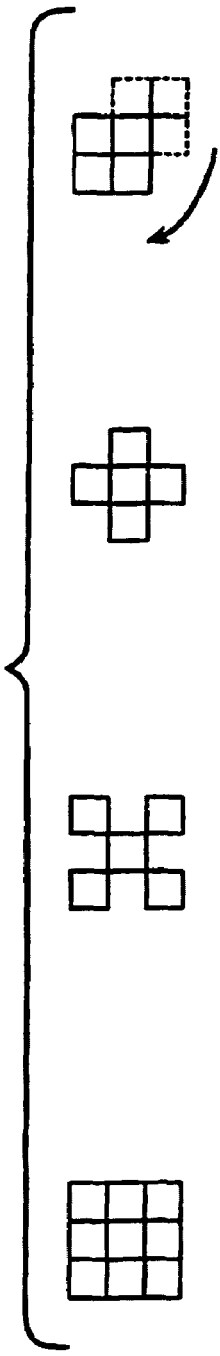
FIG. 6 is an illustration of four examples of the pixel configuration for representation of a 650-micron flake.

With reference to FIG. 6, for a 650-micron flake, the square, checkerboard and cross configurations were discernable and unacceptable. The configuration illustrated having a dashed portion, the position of which is randomly varied, was found to best simulate the irregular profile of the largest particles while providing a reasonable match in size. This configuration was also desirable from a computational standpoint in that it could be easily adapted to the construction of larger, irregular particles to represent other types of additives.

Under a microscope, all of the commercial flake samples showed a distribution of sizes which broadened after injection molding. To the eye, these variations in size were more visible in the case of larger particles. This reflects both the improved ability of an observer to resolve larger particles as well as the increased tendency of large particles to fracture during compounding.

Figure 8:
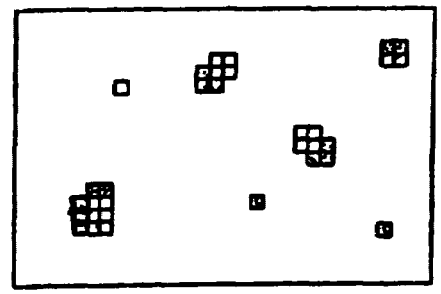
FIG. 8 is an illustration a pixel representation of a product having superimposed layers of flakes.
Figure 7:
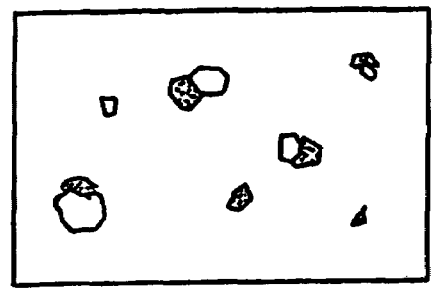
FIG. 7 is an illustration of an actual product having superimposed layers of flakes.

The appearances of a rendered image and a real part are desirably matched when the concentrations of visible flakes in each are the same (assuming the flake size distributions are properly represented). In a real part, the number of flakes which is visible is less than the number of flakes which is actually present because flakes near the surface overlap those lying beneath. Overlapping flakes of the real part, for example, illustrated in FIG. 7, are also desirably replicated in the representation or rendered image, for example, as illustrated in FIG. 8. More specifically. FIG. 7 shows a two-dimensional image of metal flakes in a material of a given volume which includes the third dimension of depth. The flake in the upper left hand corner of FIG. 7 comprises two flakes, one underneath the other. The flake that is on top is white while the flake just underneath it and thus deeper in the material is just a little offset in the Plane of the image and is shaded in grey. FIG. 8 is a computer image representation showing the offset in grey. In particular, FIG. 8 shows that the flake in the upper left hand corner comprises a nine square flake on top like the one shown in FIG. 6 along with a four square flake like the one shown in FIG. 5. The four square flake is just below the nine square flake and is shaded in grey and offset a bit to show only two of its four pixels.

One approach for replicating overlapping flakes is to construct an array in which the position of each pixel or group of pixels representing a flake is given a random set of x, y, z coordinates. The flakes are then introduced into the image starting with the largest z value (the deepest flake) and allowed to superimpose on one another as necessary.

When computation times are too long, computation can be streamlined and memory requirements reduced by randomly distributing the flakes among a limited number of layers. The calculation is carried out by first specifying a maximum viewing depth. In the current instance, the maximum thickness, maxthick, is arbitrarily defined as the depth at which the light intensity falls about 10 percent of the incident value. For a transparent resin obeying Beer's Law, this depth changes according to the following relationship:

$$maxthick = \frac{\log(0.1)}{c\varepsilon} \quad (1)$$

where c is the concentration and E is the extinction coefficient.

Reasonable simulation can be achieved by dividing the distance from the surface to the maximum depth into five layers of equal thickness and simulated flakes are introduced into the image beginning with the deepest layer and proceeding to the top layer. Since the number and size of the flakes which are introduced are known, their actual area can be readily calculated. Likewise, the overall area occupied by flake pixels in the final image including the overlapping portions of the flakes can be determined.

In a real part, the overlapping portions of the flakes can be determined by illuminating the part from below, capturing a digital image and using available image processing software (e.g., Image Pro) to calculate the obscured area. This is easily accomplished for transparent parts; opaque parts must be thinned to a dimension less than the maximum thickness. Once this data is collected for a number of different optical thickness values and flake sizes, the experimental values can be cross plotted against the simulation results to determine the weight percent of flakes which need to be added to a formulation to reproduce the flake levels shown in the virtual image. Where the specified part thickness is less than the maximum thickness, the thickness, t, is substituted for maxthick in Equation (1).

In molded samples, the majority of visible flakes are oriented with their faces nominally parallel to the part surface. However, since the reflectivity of individual flakes changes rapidly with orientation angle the overall flake population appears to have a range of gray scale values ranging from very bright (specular) to almost black. This variation is most noticeable in transparent plaques resting on a white background. The most satisfactory flake simulations were achieved by using the maximum screen intensity (R,G,B=256,256,256) to represent specularly reflecting flakes and a random gray value to represent those flakes deviating from the specular angle as well as shifting the flake color in progressively deeper layers towards the matrix color. Assuming Beer's law, the flake color in layer, 1, can be computed using the relationship $$\text{flakecolor}(l) = \text{flakecolor} - [(1 - e^{-c \cdot \varepsilon \cdot l \cdot max\ thick/4})(\text{flakecolor} - \text{matrixcolor})] \quad (2)$$

where l is the layer number (0 to 4).

Since metallic flakes act as physical tracers in the polymer melt, their presence tends to accentuate any areas where abrupt changes in flow occur. Knit lines, where portions of a molded plastic meet, are perhaps the most common example. A knit line's visibility increases markedly as the flake size decreases and matrix transparency increases. In samples containing relatively small flakes, the knit line looks almost transparent. It is believed that flakes in this region are oriented with their faces perpendicular to the face of the molding. As a result, a high degree of transparency is observed.

From the modeling standpoint, the flakes in the knit line region can be represented as pixels of zero dimension or not introducing flakes into this region. In the case of larger flakes, examination of molded samples showed that some flake bending occurred at the edges of the knit line which tended to obscure the transition. This effect was reproduced in the model by demanding that the center pixel of a large flake representation lie outside of the knit line but allowing the remaining flake pixels to extend into the restricted region. A knit line is desirably illustrated by clicking on the "Show Knit Line" button 490. Plaque 460 illustrates a product having a speckled appearance with a knit line 461.

Alternatively, the flake module or applet may contain a database (i.e., catalog) of representations or rendered images of flake appearances. After the user selects the flake type and flake level, and clicks on the "Render" button, the flake type and the flake level are used for selecting and retrieving from the database in the flake module, representations for use in generally accurately displaying the product having a speckled appearance on the user's display. From the present description, it will be appreciated by those skilled in the art that a select number of representations or rendered image files may be stored. For example, additional representations or rendered images can be constructed from smaller images using a tiling process.

While interfaces for three different flake types and flake levels are illustrated in FIG. 4, it will be appreciated that the interactive screen can be provided with more or less than three interfaces for flake types and flake levels. It is also possible to provide an interactive screen having a drop-down menu of flake type, and a separate sliding bar for selecting the size of the flake material, as well as a sliding bar for selecting the concentration of the flake material, to provide a greater variety of products having a speckled appearance.

Figure 9:
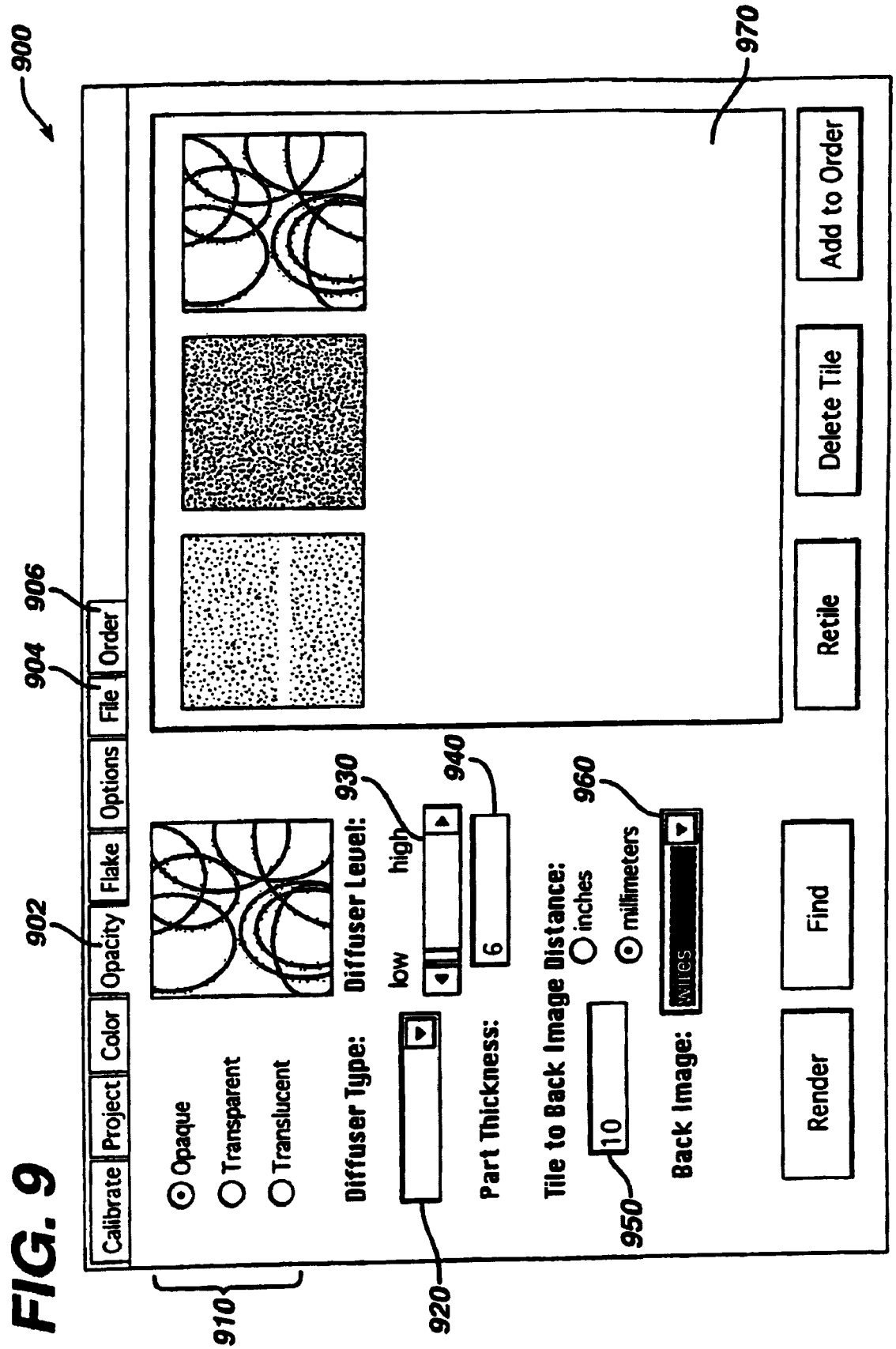
FIG. 9 is an illustration of one example of an interactive screen for selecting a diffuser material in accordance with one implementation of the process of FIG. 2.

FIG. 9 illustrates an example of an interactive screen 900 accessible by clicking on the opacity tab 902 at the top of the screen for varying the transmission of light through the product. Interactive screen 900 is provided with interfaces 910 for initially varying the transmission of light through the product, e.g., opaque (where objects cannot be seen through the product), transparent (where objects may be seen clearly through the product), and translucent (where objects cannot be seen clearly through the product).

For selection of translucent products, interactive screen 900 includes a diffuser type or material drop-down menu 920, a diffuser level sliding bar 930, a part thickness input field 940, a tile to image input field 950, and an object or back image drop-down menu 960.

Typically, the diffuser materials are small particles (about 5 microns) which are mismatched in refractive index with respect to the base plastic resin. The appearance of objects viewed through transparent resins containing these diffuser ingredients-varies depending on the size and concentration of the added particles as well as the refractive index mismatch.

Figure 10:
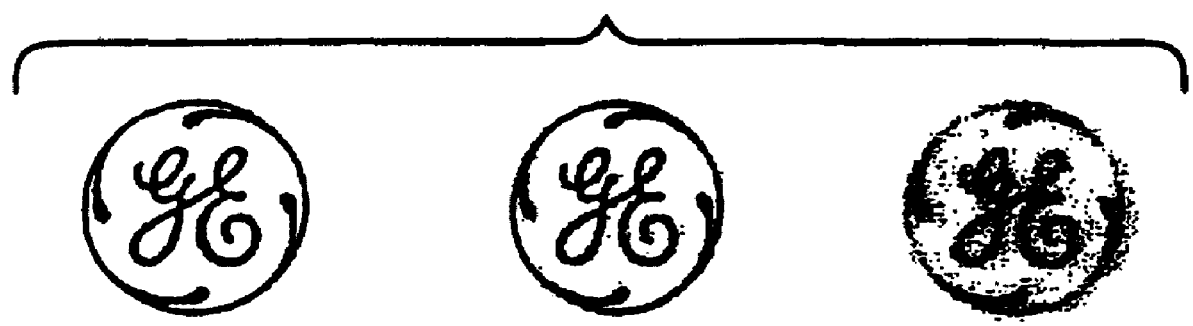
FIG. 10 are illustrations of three representations of the product with an image disposed behind the product at 0 inch, 0.07 inch, and 0.25 inch.

Desirably, to simulate the diffusing capabilities of a product, opacity module includes a software program employing Mie scattering theory (the scattering of light by a sphere) to determine the scattering characteristics of the product based on a given base material (e.g., plastic type 330, FIG. 3), the diffuser type, the diffuser level or concentration, and the part thickness. The results of this computation are then used in combination with an object and ray tracing techniques to generate an image which replicates the appearance of an object when viewed through the product. The change in appearance due to varying the distance between the product and the object is accomplished using an animation procedure. The results have been found to replicate actual photographic images with a high degree of precision. FIG. 10 illustrates three representations created using the opacity module, respectively, of the product with an image disposed behind the product at 0 inch, 0.07 inch, and 0.25 inch.

Varying the parameters that affect the scattering behavior, e.g., diffuser type, diffuser level, part thickness, and tile to back image distance, the appearance of the object, e.g., wires, through the product can be varied and controlled by the user.

With reference again to FIG. 9, a file tab 904 at the top of the screen allows a user to access an interactive screen (not shown) for transferring data relating to the target or desired designs having a visual effect from first computing unit 120 (FIG. 1) to second computing unit 140 (FIG. 1) and storing the data relating to the target or desired designs having a visual effect in a data storage unit 142 (FIG. 1) of second computing unit 140 (FIG. 1). An interactive screen typically prompts the user to input or confirm the project name or number and input a file name for storing one or more representations or plaques illustrated in virtual desk top 970.

Transferring and storing data regarding the designed product having a visual effect to computing unit 140 (FIG. 1); allows the data to be shared with others working, on the same project. For example, various users are able to view the designed products having the visual effect on their calibrated display. Security for permitting access to the various users is accomplished by setting up a project identification number and password to be shared by members of the project team.

As also shown in FIG. 9, an order tab 906 at the top of interactive screen 900 allows a user to access an interactive screen (not shown) which permits the user to send, from computing unit 120 (FIG. 1) to computing unit 140 (FIG. 1), a request for an order of an actual physical sample or micro-lot samples of the product having the visual effect. As an alternative, or in addition to ordering samples, interfaces may be provided for permitting the user to also place an order for a production quantity of the product having the visual effect.

The interactive screen for ordering products having the visual effect desirably includes interfaces for entering a form of payment such as a credit card, e-Check, and the like, for the service fees associated with producing physical samples of the products having the visual effects along with information of where to ship physical samples.

Along with a request for an order, data relating to the product having the visual effect displayed on the user's calibrated monitor is transferred to second computing unit 140 (FIG. 1) and related via a mathematical, a statistical, or a computer-based algorithm, or via a database to a formula, e.g., ingredients and concentration thereof, for compounding a product having the visual effect. Desirably, the user information, project data, designs, and compositional formulas or ingredients and concentrations for forming the product having a visual effect reside in computing unit 140 (FIG. 1).

From the present description, it will be appreciated by those skilled in the art that the process and the various modules for enabling design of a product having a visual effect may be configured so that the various interfaces are limited to selection of or input of standard colors, standard flake materials, standard diffusion materials by a user resulting in the displayed representations of the products having a visual effect being readily available in physical form from the manufacturer.

Alternatively; the process and the various modules for enabling design of a product having a visual effect may be configured to that the various interfaces allow for: input of colors, flake materials, and diffuser materials by the user resulting in displayed representations of the products having a visual effect not currently available from the manufacture. For example, certain colors may not be reproducible due to the limited available ingredients (e.g., dies and pigments) available, or limited available flake materials or sizes.

Advantageously, where the target or designed product having a visual effect is not physically available, the user is notified, for example, as noted above regarding whether the color is a custom or standard color. Desirably, the target color can be matched to an available color and displayed for the user. A process for determining an available color based on a target color is described in greater detail in U.S. Pat. No.

6,349,300 issued Feb. 19, 2002, and entitled "Method and System for Selecting Product Colors," the contents of which is incorporated in its entirety by reference.

In cases where the compositional formula which is chosen might produce some undesirable result, e.g., decreased mechanical performance, poor flow, or appearance defects, an appropriate notice is displayed together with an alternative to aid and advise the user.

The system desirably extracts and stores valuable information from users using the system. For example, the system desirably compiles a list of the colors, desired flake material, or diffuser material rendered by users over time allowing a manufacturer to determine market interest for certain products and whether to created additional standards or approved colors, flake material, and diffuser material, to determine likely requirements for purchase of currently used ingredients and whether currently used ingredients are capable to producing the target designs, and whether there is a need to obtain new ingredients not currently used. Thus, the manufacturer can respond to a changing market.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While various interactive screens have been illustrated and described, it will also be appreciated that a combined or single interactive screen may be provided for enabling design of products having a visual effect.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A computer-implemented method for enabling design of a product having a visual effect caused by an additive, the method comprising:
   obtaining information relating to the additive;
   providing a representation of the product having the visual effect based on the information relating to the additive; and
   determining ingredients and concentrations for providing the product having the visual effect.

2. The computer-implemented method of claim 1 wherein the information relating to the additive comprises information relating to a flake material, and wherein the providing comprises providing the representation of the product based on the information relating to the flake material.

3. The computer-implemented method of claim 2 wherein the information relating to the flake material comprises a type of flake material and a concentration of the flake material, and wherein the providing comprises providing the representation of the product based on the information relating to the type of the flake material and the concentration of the flake material.

4. The computer-implemented method of claim 1 wherein the information relating to the additive comprises information relating to a diffuser material, and wherein the providing comprises providing the representation of the product based on the information relating to the diffusion material.

5. The computer-implemented method of claim 4 wherein the information relating to a diffuser material comprises a type of diffuser material, a concentration of the diffuser material, a thickness of the product, and a distance between the product and an object to be observed behind the product, and wherein the providing comprises providing the representation of the product with the object behind the product based on the information relating to the type of diffuser material, the concentration of the diffuser material, the thickness of the product, and the distance between the product and an object behind the product.

6. The computer-implemented method of claim 1 further comprising obtaining information relating to the color of the product, and wherein the providing comprises providing the representation of the product based on the information relating to the color and the information relating to the additive.

7. The computer-implemented method of claim 1 wherein the providing comprises at least one of retrieving the representation from a database of representations associated with a plurality of products having visual effects, and computer generating the representation of the product having the visual effect.

8. The computer-implemented method of claim 1 further comprising storing the representation of the product having the visual effect, and allowing authorized access the representation of the product having the visual effect.

9. The computer-implemented method of claim 1 further comprising obtaining a request for a physical sample of the product having the visual effect.

10. The computer-implemented method of claim 1 wherein the product comprises a plastic material.

11. A method for enabling design of a product having a visual effect caused by an additive, the method comprising:
   obtaining information relating to the additive from a first user at a first computing unit coupled via a communications network to a second computing unit; and
   providing from the second computing unit a representation of the product having the visual effect for display on the first computing unit based on the information relating to the additive.

12. The method of claim 11 wherein the information relating to the additive comprises information relating to a flake material, and wherein the providing comprises providing the representation of the product based on the information relating to the flake material.

13. The method of claim 12 wherein the information relating to the flake material comprises a type of flake material and a concentration of the flake material, and wherein the providing comprises providing the representation of the product based on the information relating to the type of the flake material and the concentration of the flake material.

14. The method of claim 11 wherein the information relating to the additive comprises information relating to a diffuser material, and wherein the providing comprises providing the representation of the product based on the information relating to the diffusion material.

15. The method of claim 14 wherein the information relating to a diffuser material comprises a type of diffuser material, a concentration of the diffuser material, a thickness of the product, and a distance between the product and an object to be observed behind the product, and wherein the providing comprises providing the representation of the product with the object behind the product based on the information relating to the type of diffuser material, the concentration of the diffuser material, the thickness of the product, and the distance between the product and an object behind the product.

16. The method of claim 11 further comprising obtaining information relating to the color of the product, and wherein the providing comprises providing the representation of the product based on the information relating to the color and the information relating to the additive.

17. The method of claim 11 wherein the providing comprises at least one of retrieving the representation from a database of representations associated with a plurality of products having visual effects, and computer generating the representation of the product having the visual effect.

18. The method of claim 11 further comprising storing the representation of the product having the visual effect at the second computing unit, and allowing authorized access to the representation of the product having the visual effect by at least one second user at at least one third computing unit.

19. The method of claim 11 further comprising obtaining a request at the second computing unit for a physical sample of the product having the visual effect from the first computing unit.

20. The method of claim 11 further comprising determining at the second computing unit ingredients and concentrations for producing the product having the visual effect.

21. The method of claim 11 wherein the product comprises a plastic material.

22. The method of claim 11 wherein the communications network is a global computer network.

23. The method of claim 11 further comprising transferring, from the second computing unit, a module for representing a plurality of products having a plurality of the additives to the first computing unit.

24. A system for enabling design of a product having a visual effect caused by an additive, said system comprising:
at least one processor adapted to obtain information relating to the additive;
said at least one processor adapted to provide a representation of the product having the visual effect based on the information relating to the additive; and
wherein said at least one processor is adapted to determine ingredients and concentrations for producing the product having the visual effect.

25. The system of claim 24 wherein the information relating to the additive comprises information relating to a flake material, and wherein the representation of the product is based on the information relating to the flake material.

26. The system of claim 25 wherein the information relating to the flake material comprises a type of flake material and a concentration of the flake material, and wherein the representation of the product is based on the information relating to the type of the flake material and the concentration of the flake material.

27. The system of claim 24 wherein the information relating to the additive comprises information relating to a diffuser material, and wherein the representation of the product is based on the information relating to the diffusion material.

28. The system of claim 27 wherein the information relating to a diffuser material comprises a type of diffuser material, a concentration of the diffuser material, a thickness of the product, and a distance between the product and an object to be observed behind the product, and wherein the representation of the product with the object behind the product is based on the information relating to the type of diffuser material, the concentration of the diffuser material, the thickness of the product, and the distance between the product and an object behind the product.

29. The system of claim 24 wherein said at least one processor is adapted to obtain information relating to the color of the product, and wherein the representation of the product is based on the information relating to the color and the information relating to the additive.

30. The system of claim 24 wherein said at least one processor is adapted to at least one of retrieve the representation from a database of representations associated with a plurality of products having visual effects, and computer generate the representation of the product having the visual effect.

31. The system of claim 24 wherein said at least one processor is adapted to store the representation of the product having the visual effect, and to allow authorized access the representation of the product having the visual effect.

32. The system of claim 24 where said at least one processor is adapted to obtain a request for a physical sample of the product having the visual effect.

33. The system of claim 24 wherein the product comprises a plastic material.

34. A system for enabling design of a product having a visual effect caused by an additive, said system comprising:
means for obtaining information relating to the additive from a first user at a first computing unit coupled via a communications network to a second computing unit; and
means for providing from the second computing unit a representation of the product having the visual effect for display on the first computing unit based on the information relating to the additive.

35. The system of claim 34 wherein the information relating to the additive comprises information relating to a flake material, and wherein the representation of the product is based on the information relating to the flake material.

36. The system of claim 35 wherein the information relating to the flake material comprises a type of flake material and a concentration of the flake material, and wherein the representation of the product is based on the information relating to the type of the flake material and the concentration of the flake material.

37. The system of claim 34 wherein the information relating to the additive comprises information relating to a diffuser material, and wherein the representation of the product is based on the information relating to the diffusion material.

38. The system of claim 37 wherein the information relating to a diffuser material comprises a type of diffuser material, a concentration of the diffuser material, a thickness of the product, and a distance between the product and an object to be observed behind the product, and wherein the representation of the product with the object behind the product is based on the information relating to the type of diffuser material, the concentration of the diffuser material, the thickness of the product, and the distance between the product and an object behind the product.

39. The system of claim 34 further comprising means for obtaining information relating to the color of the product, and wherein the representation of the product is based on the information relating to the color and the information relating to the additive.

40. The system of claim 34 further comprising at least one of means for retrieving the representation from a database of representations associated with a plurality of products having visual effects, and means for computer generating the representation of the product having the visual effect.

41. The system of claim 34 further comprising means for storing the representation of the product having the visual effect at the second computing unit, and means for allowing the authorized access to the representation of the product having the visual effect by at least one second user at at least one third computing unit.

42. The system of claim 34 further comprising means for obtaining a request at the second computing unit for a physical sample of the product having the visual effect from the first computing unit.

43. The system of claim 34 further comprising means for determining at the second computing unit ingredients and concentrations for producing the product having the visual effect.

44. The system of claim 34 wherein the product comprises a plastic material.

45. The system of claim 34 wherein the communications network is a global computer network.

46. The system of claim 34 further comprising means for transferring, from the second computing unit, a module for representing a plurality of products having a plurality of the additives to the first computing unit.

47. At least one program storage device readable by a machine, tangibly embodying at least one program of instructions executable by the machine to perform a method for enabling design of a product having a visual effect caused by an additive, the method comprising:
obtaining information relating to the additive;
providing a representation of the product having the visual effect based on the information relating to the additive; and
determining ingredients and concentrations for producing the product having the visual effect.

48. The at least one program storage device of claim 47 wherein the information relating to the additive comprises information relating to a flake material, and wherein the providing comprises providing the representation of the product based on the information relating to the type of the flake material.

49. The at least one program storage device of claim 48 wherein the information relating to the flake material comprises a type of flake material and a concentration of the flake material, and wherein the providing comprises providing the representation of the product based on the information relating to the type of the flake material and the concentration of the flake material.

50. The at least one program storage device of claim 47 wherein the information relating to the additive comprises information relating to a diffuser material, and wherein the providing comprises providing the representation of the product based on the information relating to the diffusion material.

51. The at least one program storage device of claim 50 wherein the information relating to a diffuser material comprises a type of diffuser material, a concentration of the diffuser material, a thickness of the product, and a distance between the product and an object to be observed behind the product, and wherein the providing comprises providing the representation of the product with the object behind the product based on the information relating to the type of diffuser material, the concentration of the diffuser material, the thickness of the product, and the distance between the product and an object behind product.

52. The at least one program storage device of claim 47 further comprising obtaining information relating to the color of the product, and wherein the providing comprises providing the representation of the product based on the information relating to the color and the information relating to the additive.

53. The at least program storage device of claim 47 wherein the providing comprises at least one of retrieving the representation from a database of representations associated with a plurality of products having visual effects, and computer generating the representation of the product having the visual effect.

54. The at least one program storage device of claim 47 further comprising storing the representation of the product having the visual effect, and allowing authorized access the representation of the product having the visual effect.

55. The at least one program storage device of claim 47 further comprising obtaining a request for a physical sample of the product having the visual effect.

56. The at least one program storage device of claim 47 wherein the product comprises a plastic material.

57. An article of manufacture comprising:
at least one computer usable medium having computer readable program code means embodied therein for enabling design of a product having a visual effect caused by an additive, the computer readable program code means in said article of manufacture comprising:
computer readable program code means for causing a first computing unit to obtain information relating to the additive from a first user at the first computing unit coupled via a communications network to a second computing unit; and
computer readable program code means for causing the second computing unit to provide a representation of the product having the visual effect for display on the first computing unit based on the information relating to the additive.

58. The article of manufacture of claim 57 wherein the information relating to the additive comprises information relating to a flake material, and wherein the providing comprises providing the representation of the product is based on the information relating to the flake material.

59. The article of manufacture of claim 58 wherein the information relating the to the flake material comprises a type of flake material and a concentration of the flake material, and wherein the representation of the product is based on the information relating to the type of the flake material and the concentration of the flake material.

60. The article of manufacture of claim 57 wherein the information relating to the additive comprises information relating to a diffuser material, and wherein the representation of the product is based on the information relating to the diffusion material.

61. The article of manufacture of claim 60 wherein the information relating to a diffuser material comprises a type of diffuser material, a concentration of the diffuser material, a thickness of the product, and a distance between the product and an object to be observed behind the product, and wherein the representation of the product with the object behind the product is based on the information relating to the type of diffuser material, the concentration of the diffuser material, the thickness of the product, and the distance between the product and an object behind the product.

62. The article of manufacture of claim 57 further comprising computer readable program code means for causing the first computing unit to obtain information relating to the color of the product, and wherein the representation of the product is based on the information relating to the color and the information relating to the additive.

63. The article of manufacture of claim 57 further comprising computer readable program code means for causing at least one of the first and second computing units to at least one of retrieve the representation from a database of representations associated with a plurality of products having visual effects, and to computer generate the representation of the product having the visual effect.

64. The article of manufacture of claim 57 further comprising computer readable program code means for causing the second computing unit to store the representation of the product having the visual effect, and computer readable code means for causing the second computing unit to allow authorized access to the representation of the product having the visual effect by at least one second user at at least one third computing unit.

65. The system of claim 57 further comprising computer readable program code means for causing the second computing unit to obtain a request for a physical sample of the product having the visual effect from the first computing unit.

66. The system of claim 57 further comprising computer readable program code means for causing the second computing unit to determine ingredients and concentrations for producing the product having the visual effect.

67. The system of claim 57 wherein the product comprises a plastic material.

68. The system of claim 57 wherein the communication network is a global computer network.

69. The system of claim 57 further comprising computer readable program code means for causing the second computing unit to transfer a module for representing a plurality of products having a plurality of the additives to the first computing unit.

70. A computer-implemented method for enabling design of a product having a visual effect caused by an additive, the method comprising:
obtaining information relating to the additive;
providing a representation of the product having the visual effect based on the information relating to the additive;
determining ingredients and concentrations for providing the product having the visual effect;
wherein the information relating to the additive comprises information relating to a diffuser material, and wherein the providing comprises providing the representation of the product based on the information relating to the diffusion material; and
wherein the information relating to the flake material comprises a type of flake material and a concentration of the flake material, and wherein the providing comprises providing the representation of the product based on the information relating to the type of the flake material and the concentration of the flake material.

71. A computer-implemented method for enabling design of a product having a visual effect caused by an additive, the method comprising:
obtaining information relating to the additive;
providing a representation of the product having the visual effect based on the information relating to the additive;
determining ingredients and concentrations for providing the product having the visual effect;
wherein the information relating to the additive comprises information relating to a diffuser material, and wherein the providing comprises providing the representation of the product based on the information relating to the diffusion material; and
wherein the information relating to a diffuser material comprises a type of diffuser material, a concentration of the diffuser material, a thickness of the product, and a distance between the product and an object to be observed behind the product, and wherein the providing comprises providing the representation of the product with the object behind the product based on the information relating to the type of diffuser material, the concentration of the diffuser material, the thickness of the product, and the distance between the product and an object behind the product.

* * * * *